July 7, 1936. W. H. HARDER 2,046,377
AUTOMOBILE SIGNAL
Filed April 23, 1931 2 Sheets-Sheet 1

INVENTOR
William H. Harder
BY
Chappell & Earl
ATTORNEYS

July 7, 1936.   W. H. HARDER   2,046,377
AUTOMOBILE SIGNAL
Filed April 23, 1931   2 Sheets-Sheet 2

INVENTOR.
William H. Harder
BY
Chappell & Earl
ATTORNEYS

Patented July 7, 1936

2,046,377

UNITED STATES PATENT OFFICE 2,046,377

AUTOMOBILE SIGNAL

William H. Harder, Chicago, Ill., assignor of one-half to Leo Griffin, Jackson, Mich.

Application April 23, 1931, Serial No. 532,268

1 Claim. (Cl. 177—339)

The main object of this invention is to provide a turning signal for automobiles and the like which is simple and economical to construct and efficient and reliable in operation.

Another object of my invention is to provide means for manually controlling a signal for indicating that a turn is to be made and its direction and means for automatically discontinuing said indication upon the completion of the turn for which said indication was made.

Objects relating to details and economies of my invention will appear from the description to follow. The invention is defined and pointed out in the claim.

A structure which is a preferred embodiment of my invention is illustrated in the accompanying drawings, in which.

Figure 1:
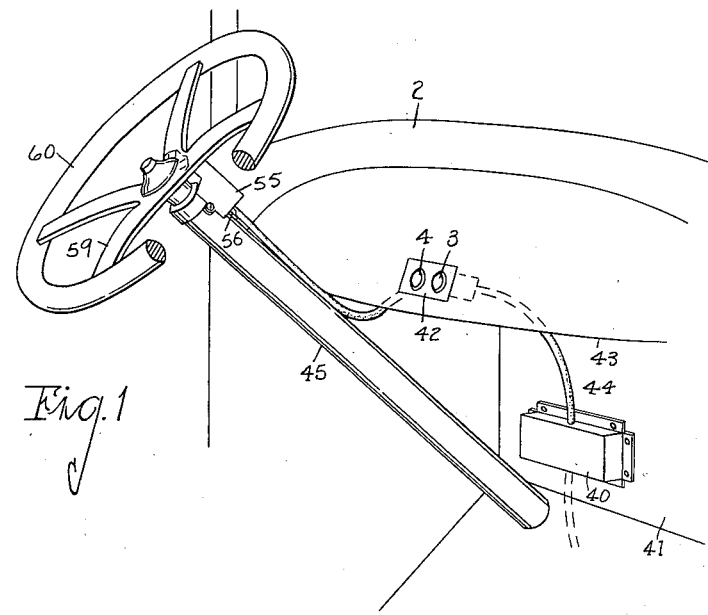
Fig. 1 is a perspective view of the inside of an automobile having a preferred embodiment of my invention associated therewith.
Figure 2:
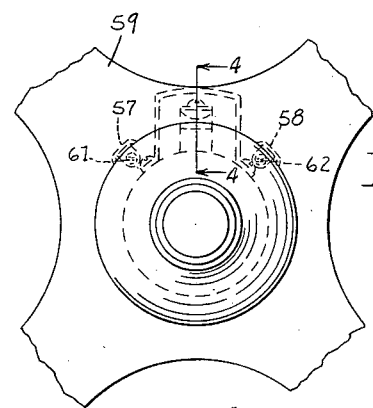
Fig. 2 is a top plan view of the inside of the steering wheel of an automobile illustrated by Fig. 1.
Figure 3:
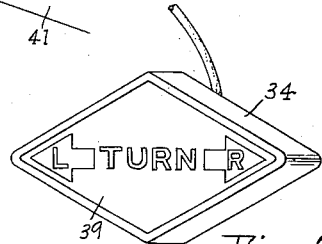
Fig. 3 is a perspective view in side and front elevation of the electric signal.

Referring to the drawings, numeral 1 indicates a source of electric power such as a battery which may be the conventional battery used for energizing the electric circuits of the automobile that is represented by the reference numeral 2. It will be understood here that the device may be used with any type of vehicle or automotive vehicles but it is particularly adaptable for use with conventional automobiles.

Figure 5:
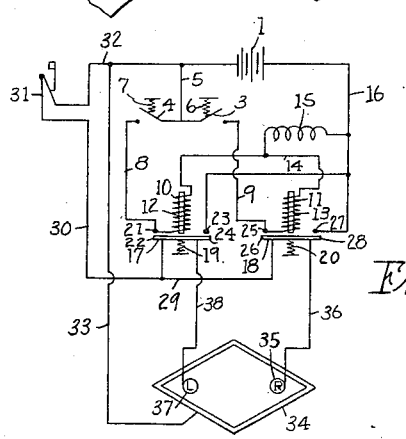
Fig. 5 is a simplified schematic representation of the circuit diagram of the device.
Figure 6:
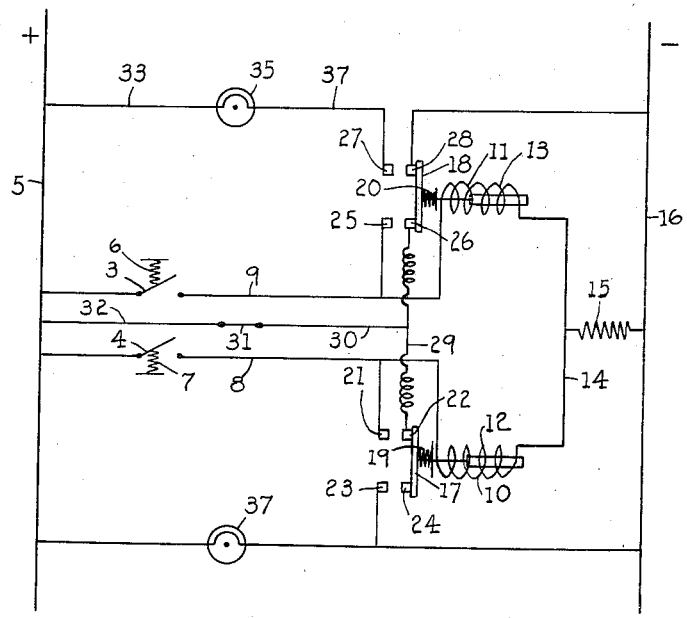
Fig. 6 is an across-the-line diagram of the circuit.

Referring to Fig. 5, the battery 1 is connected to the terminals of a pair of normally open push button switches 3 and 4 by means of a conductor 5. The push button switches 3 and 4 are normally held open by springs 6 and 7. The other terminals of the normally open push button switches 3 and 4 are connected by means of conductors 8 and 9 to the terminals of a pair of relay coils 10 and 11 of a pair of relays 12 and 13. The other terminals of the relay coils 10 and 11 are connected together by means of a common conductor 14 to which in turn is connected a resistor 15 which leads to the other terminal of the battery 1 through a conductor 16.

The relays 10 and 11 are provided with armatures 17 and 18 respectively which are normally held open by springs 19 and 20. Each of the armatures 17 and 18 is provided with two pairs of contact members.

The contact members operated by the armature 17 are indicated by the reference numerals 21 and 22, and 23 and 24. The two pair of contact members operated by the armature 18 are indicated by the reference numerals 25 and 26, and 27 and 28.

When the relay armature 10, for example, is energized, the armature 17 is drawn upwardly against the force of the spring 19 thereby closing the pair of contact members 21 and 22 and simultaneously the pair of contact members 23 and 24. The armature 18 closes its contact members in a similar manner when the relay coil 11 is energized.

The contact members 22 and 26 on the armatures 17 and 18 respectively are connected together by means of a conductor 29 which in turn is connected through a conductor 30 to a normally closed switch 31. The other side of the normally closed switch 31 is connected by means of a conductor 32 to one terminal of the battery 1.

The normally closed switch 31 is adapted to form a part of a holding circuit for each of the relay coils 10 and 11. For example, let us suppose that the push button 3 is momentarily closed. This places the battery 1, conductor 5, push button switch 3, conductor 9, relay coil 11, conductor 14, resistor 15 and conductor 16 in series circuit relation with each other. With this circuit established, the battery 1 energizes the coil 11 which closes both pairs of the contacts on the ends of the armature 18. A holding circuit results which includes the battery 1, conductor 32, normally closed switch 31, conductor 30, contact members 25 and 26, relay coil 11, conductor 14, resistor 15 and conductor 16, thereby causing the battery 1 to continue to energize the relay coil 11. Another circuit is formed by the closing of the pair of contact members 27 and 28 on the other side of the armature 18 which includes battery 1, a conductor 33, signal casing 34, signal lamp 35, a conductor 36, contact members 27 and 28 and conductor 16. The battery 1 energizes the lamp 35 through this circuit.

The signal casing 34 is also provided with another lamp 37 which has one terminal connected to the casing 34 and the other terminal connected to the contact member 24 by means of a conductor 38 so that similar circuits are formed when the push button switch 4 is closed.

The casing 34 is preferably of the shape indicated and may be constructed of sheet metal or the like. The casing 34 is provided with a window 39 of translucent material such as glass having the word "Turn" painted on the middle thereof—for example in black on a green background with left and right hand arrows pointing therefrom marked respectively "Left" and "Right". The arrows are preferably positioned directly over the lamps 35 and 37 so that when one of them is lighted, the arrow and its light shows up distinctly.

The upper part of the casing 34 may be used for the usual stop light and the lower part may be used for the usual red tail-light.

The casing 34 may be mounted on any part of the automobile preferably at the back thereof so that it is visible to motorists driving behind the automobile 2.

The relays 12 and 13 and the resistor 15 are preferably mounted in a casing 40 which may be mounted in any convenient place such as on the dashboard 41 of the automobile. The normally open push buttons are preferably mounted in a casing 42 which may be attached to the instrument board 43 within convenient reach of the driver of the vehicle.

A cable 44 is provided between the casings 40 and 42 for the purpose of carrying the conductors which lead from the relays to the normally open push button switches 3 and 4.

Figure 4:
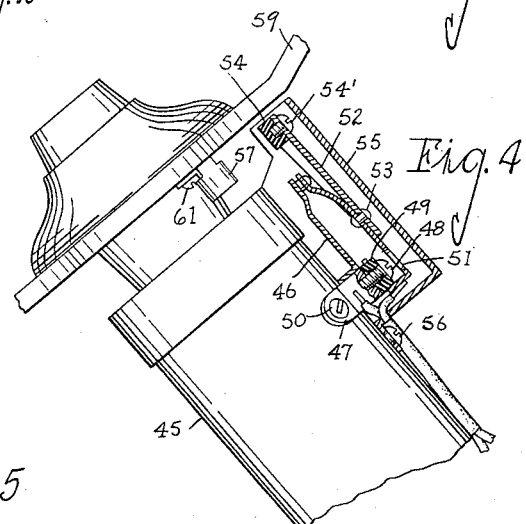
Fig. 4 is a view in side elevation of the upper part of the steering wheel assembly shown in Fig. 1 with parts thereof broken away and parts shown in cross section.

The normally closed switch 31 is preferably mounted on the steering column 45 of the machine. The switch 31 as illustrated in detail by Fig. 4 preferably comprises a contact member 46 which is secured to a bracket 47 by means of a screw 48 which extends through a washer 49 of insulating material. The bracket 47 is mounted to the steering column by means of screws 50. A second contact member 51 is secured to the bracket 47 and extends parallel to the first named contact member 46. The outer ends of the contact members 46 and 51 are preferably bent inwardly toward each other so that they are normally biased into contact with each other.

A connecting member 52 is secured to the contact member 51 in any suitable manner as for example by means of a rivet 53. This connecting member 52 is provided at its outer end with an insulating member 54 which is secured to the connecting member 52 by means of a screw 54. The outer casing 55 is mounted on the steering column 45 by means of screws 56 for protecting the normally closed switch 31 from injury.

A pair of extension members 57 and 58 are mounted on the inside of the web 59 of the steering wheel 60 by means of screws 61 and 62 respectively. The extension members 57 and 58 are spaced apart so that under normal driving conditions straight ahead neither one of the extension members engages the insulating member 54 on the end of the connecting member 52. However, when the steering wheel 60 is turned through a predetermined angle to the right or left, one of the extension members 57 or 58 engages the insulating member 54 and pushes the connecting member 52 upwardly which carries the contacting member 51 with it and brakes the contact between the contacting members 46 and 51. As pointed out above, when this occurs, the holding circuit is opened, and the relay coils are de-energized which in turn causes the relay armatures to open the pairs of contact members.

Let us suppose that the driver is driving in a straight line but he desires to make a right-hand turn. Coming to this conclusion, he reaches forward and presses the push button switch 3. This normally causes the battery 1 to energize the relay 11 which snaps the armature 18 into its closed position where it is held by the closing circuit pointed out above. The contact members 27 and 28 being closed, the energizing circuit to the lamp 35 is established and the battery 1 lights the lamp 35 thereby indicating that the vehicle will be turned to the right. The driver proceeds to make the turn thereby bringing the extension member 57 into engagement with the insulating member 54 which operates to open the normally closed switch 31 thereby de-energizing the relay coil 11, returning the armature 18 to normal, breaking the contacts 27 and 28 and de-energizing the lamp 35. The steering wheel 60 is then straightened out for normal operation and when it is desired to make another turn, the same sequence of operation takes place.

From the above description, it will be appreciated that I provide manually controlled means for indicating when a turn is desired to be made and automatic means for discontinuing said indication upon completion of the turn.

Various changes may be made in the details of construction of my preferred embodiment without departing from the spirit of my invention as set forth by the following claim.

Having thus described my invention, what I claim as new and desire to secure by Letters Patent, is:

In combination in an automobile turning signal device, a battery, a normally open push button switch, a relay having a coil and an armature having two pairs of normally open contact members adapted to be simultaneously closed when the relay coil is energized, means connecting said battery, push button switch and relay coil in series circuit relation, a normally closed switch, means connecting said battery, normally closed switch, one pair of contact members and relay coil in a series circuit, a signal and means connecting said battery, signal, and other pair of contact members in a second series circuit, said battery energizing said relay when said push button switch is momentarily closed thereby causing said relay armature to simultaneously close both pairs of said normally open contacts, said battery continuing to energize said relay coil through said normally closed switch and said one pair of contact members after said push button switch is opened, said battery at the same time energizing said signal through said other pair of contacts, means rotatable in accordance with the turning of the automobile to open said normally closed switch, said battery being disconnected from said relay coil when said normally closed switch is momentarily opened, thereby releasing said relay armature which simultaneously opens said both pairs of contact members thereby returning the system to normal.

WILLIAM H. HARDER.